(12) United States Patent
Kodama et al.

(10) Patent No.: US 7,821,659 B2
(45) Date of Patent: Oct. 26, 2010

(54) IMAGE PROCESSING METHOD AND IMAGE PROCESSING DEVICE

(75) Inventors: Mari Kodama, Ebina (JP); Ryuichi Ishizuka, Ebina (JP); Yasushi Nishide, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1058 days.

(21) Appl. No.: 11/035,127

(22) Filed: Jan. 14, 2005

(65) Prior Publication Data
US 2005/0174588 A1    Aug. 11, 2005

(30) Foreign Application Priority Data
Feb. 6, 2004    (JP)    ............... 2004-030573

(51) Int. Cl.
G06F 3/12    (2006.01)
G03F 3/00    (2006.01)
H04N 1/54    (2006.01)
H04N 1/56    (2006.01)
H04N 1/60    (2006.01)
H04N 1/62    (2006.01)
G09G 5/06    (2006.01)

(52) U.S. Cl. ............... 358/1.15; 358/1.9; 358/518; 358/501; 358/515; 358/523; 358/524; 358/537; 358/540; 382/162; 382/163; 382/164; 382/165; 382/167; 345/601; 345/602; 345/603; 345/604

(58) Field of Classification Search ............... 358/1.15, 358/1.9, 518, 501, 515, 523, 524, 537, 540; 382/162, 163, 164, 165, 167; 345/601, 602, 345/603, 604

See application file for complete search history.

(56) References Cited

U.S. PATENT DOCUMENTS

| | | | | |
|---|---|---|---|---|
| 4,774,567 A | * | 9/1988 | Stansfield et al. | ............ 358/515 |
| 5,075,787 A | * | 12/1991 | Shaughnessy et al. | ....... 358/452 |
| 5,175,804 A | * | 12/1992 | Wittmann | ................... 358/1.8 |

(Continued)

FOREIGN PATENT DOCUMENTS

JP    A-07-147629    6/1995

(Continued)

OTHER PUBLICATIONS

"Transparency in PDF: Technical Note #5407", Nov. 30, 2000, Adobe (R) Developer Technologies, Adobe (R) Systems Inc., pp. 1-76.*

*Primary Examiner*—Edward L Coles
*Assistant Examiner*—Beniyam Menberu
(74) *Attorney, Agent, or Firm*—Oliff & Berridge, PLC

(57) ABSTRACT

When there is an object of a color plate which is different than a process color, it is confirmed whether or not Color (n), which corresponds to that color name Spot (n), is a spot color. If Color (n) is a spot color, CMYK value conversion is carried out from a LUT of that spot color, and CMYK values are composed in a region for output. If Color (n) is a process color, CMYK values thereof are stored in a region for CMYK color correction. After color correction is carried out on the CMYK values of the region for CMYK color correction, they are composed with CMYK values of the region for CMYK output. Color information when a color plate different than a process color is included, is generated.

2 Claims, 7 Drawing Sheets

U.S. PATENT DOCUMENTS

| | | | |
|---|---|---|---|
| 5,796,869 A * | 8/1998 | Tsuji et al. | 382/203 |
| 5,822,503 A * | 10/1998 | Gass et al. | 358/1.9 |
| 5,936,749 A * | 8/1999 | Ikeda | 358/515 |
| 6,456,395 B1 * | 9/2002 | Ringness | 358/1.9 |
| 6,519,050 B1 * | 2/2003 | Eintracht et al. | 358/1.15 |
| 6,717,699 B1 * | 4/2004 | Janssen et al. | 358/2.1 |
| 6,943,915 B1 * | 9/2005 | Teraue | 358/1.9 |
| 7,164,498 B2 * | 1/2007 | Van Bael | 358/1.9 |
| 7,408,673 B1 * | 8/2008 | Chinn et al. | 358/1.9 |
| 7,420,707 B2 * | 9/2008 | Agehama | 358/1.9 |
| 7,463,383 B2 * | 12/2008 | Nishide et al. | 358/1.9 |
| 2003/0007173 A1 * | 1/2003 | Nishide et al. | 358/1.15 |
| 2003/0043393 A1 * | 3/2003 | Iwasaki | 358/1.9 |
| 2003/0058291 A1 * | 3/2003 | Pinard et al. | 347/15 |
| 2003/0058477 A1 * | 3/2003 | Brunk et al. | 358/3.28 |
| 2004/0032602 A1 * | 2/2004 | Teraue | 358/1.9 |
| 2004/0051884 A1 * | 3/2004 | Saxton | 358/1.9 |
| 2004/0051887 A1 * | 3/2004 | Nishide et al. | 358/1.9 |
| 2004/0080765 A1 * | 4/2004 | Nishide et al. | 358/1.9 |
| 2004/0083430 A1 * | 4/2004 | Boonen | 715/523 |
| 2004/0179713 A1 * | 9/2004 | Tani et al. | 382/100 |
| 2005/0041835 A1 * | 2/2005 | Reed et al. | 382/100 |
| 2005/0052666 A1 * | 3/2005 | Yamamoto et al. | 358/1.9 |
| 2005/0062757 A1 * | 3/2005 | Nakamori | 345/604 |
| 2005/0150411 A1 * | 7/2005 | Bestmann | 101/484 |
| 2005/0243374 A1 * | 11/2005 | Nishide et al. | 358/2.1 |
| 2005/0286085 A1 * | 12/2005 | Lee | 358/3.26 |
| 2006/0098233 A1 * | 5/2006 | Jodra et al. | 358/3.26 |

FOREIGN PATENT DOCUMENTS

| | | |
|---|---|---|
| JP | 10-248017 | 9/1998 |
| JP | A 2000-062253 | 2/2000 |
| JP | A 2003-348366 | 12/2003 |

* cited by examiner

F I G. 2
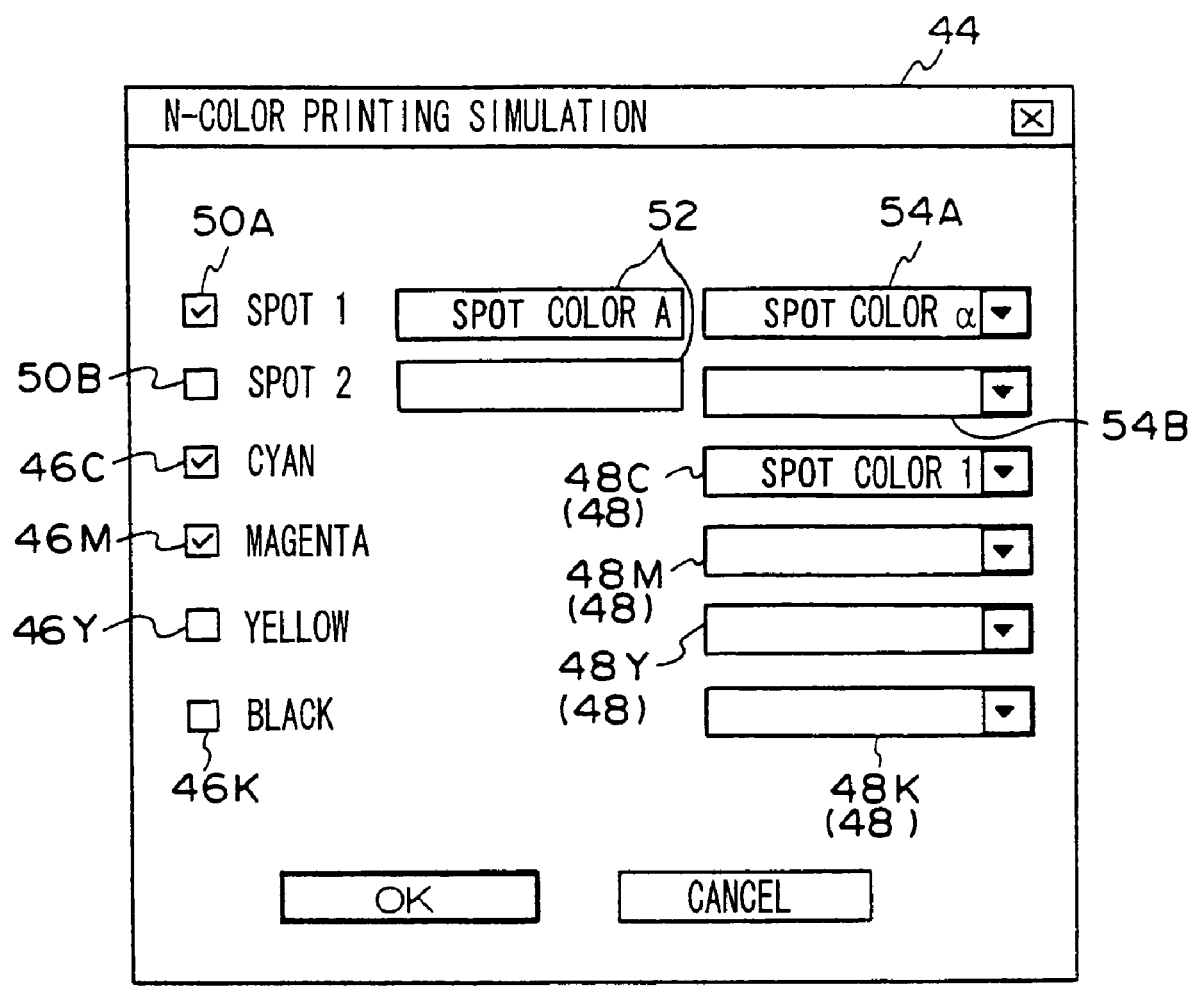

F I G. 5

```
...
%%Page: 1 1
%%BeginPageSetup
%RBIIncludePageSlotInvocation
mTSsetup
pmSVsetup
initializepage
(; Page : 1 / 2)setjob
%%EndPageSetup
gS 0 0 572 819 rC
1 G
0 0 0 0 rF
0 0 :M %%QRKSequentialPageRange: 1 1

%%QRKPageBegin: 1

%%QRKSequentialPage: 1

%%PlateColor: Cyan

QuarkXPress_4.1 begin

...

%%PlateColor:SpecialColorA
```

IMAGE PROCESSING METHOD AND IMAGE PROCESSING DEVICE

CROSS-REFERENCE TO RELATED APPLICATION

This application claims priority under 35 USC 119 from Japanese Patent Application No. 2004-030573, the disclosure of which is incorporated by reference herein.

BACKGROUND OF THE INVENTION

1. Field of the Invention

The present invention relates to an image processing method and an image processing device at the time of outputting image data to an output device which forms, on a recording sheet, an image corresponding to image data for multicolor printing. More specifically, the present invention relates to an image processing method and an image processing device for image data or image-drawing commands which include spot colors which are different than process colors.

2. Description of the Related Art

DTP (desktop publishing) is becoming increasingly popular as a digital method in the field of printing processing. In DTP, a page layout is prepared by carrying out image creation, manipulation, editing, and the like at a processing device such as a personal computer, a work station, or the like. On the basis of this page layout, a film for exposing a printing plate is prepared (CEPS), or image data is directly written to a printing plate in order to prepare a printing plate for printing (CTP: Computer to Plate).

When proofing or the like is carried out before printing by using the actual printing plate, the page layout displayed on a monitor is printed-out by a print-out device such as a page printer or the like by using a WYSIWYG function or the like.

On the other hand, usual color printing is carried out by using the four colors (process colors) of cyan, magenta, yellow, and black. However, there are cases in which color printing is carried out by using, as needed, inks of colors (hereinafter, "spot colors") which are different than the process colors. Further, in order to keep printing costs down, there are cases in which two-color printing is carried out. In such cases, special effects may be obtained by using one color among the process colors and a spot color, or by using spot colors for the two colors.

In current applications for DTP, combinations of a spot color and a spot color, or of a spot color and a process color, cannot be designated easily. Therefore, the data for two-color printing is generally output onto films by using two process colors, and printing is carried out by using an ink of a color different than a process color (i.e., a spot color) on the two printing plates which have been obtained as a result.

On the other hand, only outputs in process colors can be obtained in printing simulations for such image data. Therefore, it is difficult to clearly confirm how the actual printed matter will turn out.

Thus, it is known to provide a following method of carrying out spot color printing simulation: a color chart is printed by actually using a printing plate, by using the predetermined spot color ink used in the two-color printing. By measuring this color chart, a profile for the spot color (a CMYK—L*a*b* look-up table) is created. By using this profile for the spot color and a profile for the printer (a L*a*b*—C'M'Y'K' look-up table), CMYK—C'M'Y'K' conversion using a color management function is realized, and the simulation of spot color printing is thereby carried out.

Moreover, it is known to provide a method of outputting a color comprehensive layout by replacing the respective colors of a document, which is prepared by using for example any two colors among C, M, Y, K, by desired ink colors (spot colors).

However, printing simulations using spot colors can only address the substitution of a spot color with respect to a process color plate. However, there are cases in which a document, which includes an object using a spot color, is prepared, and the object of the spot color cannot be replaced by another spot color in the processes of design and examination.

SUMMARY OF THE INVENTION

In accordance with one aspect of the present invention, there is provided an image processing method comprising: carrying out image processing on image data or an image-drawing command inputted from an image processing terminal; and when color replacement and a replacement color are set for a color which is different than a process color in the image data or the image-drawing command, generating new color information by replacing color information of the color in the image data or the image-drawing command, with color information of the replacement color.

In accordance with another aspect of the present invention, there is provided an image processing method comprising: carrying out image processing on image data or an image-drawing command inputted from an image processing terminal; and when color information of a color which is different than a process color is included in the image data or the image-drawing command, generating new color information which excludes the color information of the color.

In accordance with yet another aspect of the present invention, there is provided an image processing device carrying out image processing on image data or an image-drawing command inputted from an image processing terminal, the image processing device comprising: an extracting unit that extracts color information of a color which is different than a process color in the image data or the image-drawing command; a color replacing unit that, when color replacement and a replacement color are designated for the color which is different than a process color and which is extracted by the extracting unit, carries out color replacement which generates new color information, by replacing the color information of said color in the image data or the image-drawing command with color information of the replacement color; and a generating unit that, on the basis of the color information generated by the replacing unit, generates new color information of the image data or the image-drawing command.

BRIEF DESCRIPTION OF THE DRAWINGS

A embodiment of the invention will be described in detail based on the following figures, wherein:

FIG. 2 is a schematic diagram of a setting dialog, showing an example of a user interface used in setting N-color printing simulation;

FIG. 5 is a schematic diagram showing an example of a description in PostScript format at the time of carrying out plate-separated output;

DETAILED DESCRIPTION OF THE INVENTION

Figure 1:
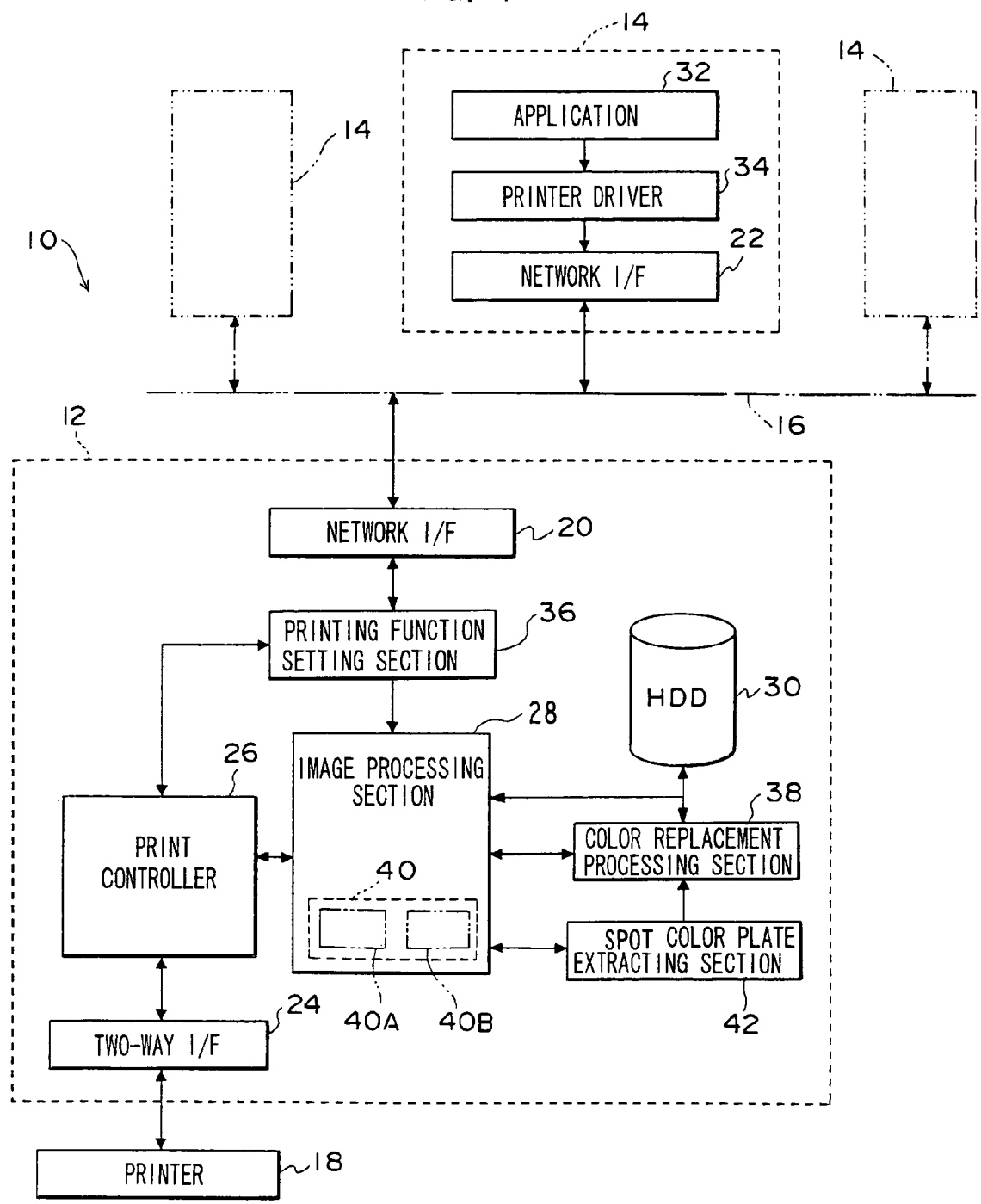
FIG. 1 is a block diagram of main portions, showing the schematic structure of a printer server and client terminals applied to the present embodiment.

Hereinafter, an embodiment of the present invention will be described with reference to the drawings. FIG. 1 shows the schematic structure of a network 10 applied to the present embodiment. In the network 10, a print server 12, which is provided as an image processing device applying the present invention, and a plurality of client terminals 14, which are provided as image processing terminals, are network-connected via a communication line 16.

A printer 18 serving as a print-out device is connected to the print server 12. When the print server 12 receives a print job outputted from the client terminal 14, printing-out corresponding to that print job is possible.

Hereinafter, description will be given by using an image processing device as the print server. However, the image processing device of the present invention is not limited to the same, and may be a structure that carries out image processing and that is provided at any type of intermediate server, such as a file server or the like, which is network-connected to the client terminals 14. Further, the present invention is not limited to use of the printer 18, and a plate setter, which directly exposes a photosensitive lithographic printing plate or the like on the basis of image data in order to prepare a printing plate for printing, or an exposure device, which exposes a document film using image printing (exposure) onto a photosensitive lithographic printing plate, or the like can be connected.

Network interfaces (network I/Fs) 20, 22 are provided at the print server 12 and the client terminals 14. The print server 12 and the client terminals 14 are connected to the communication line 16 via the network I/Fs 20, 22, respectively. The printer server 12 also has a two-way interface (two-way I/F) 24, and is connected to the printer 18 via this two-way I/F 24.

A plurality of the printers 18 may be connected to the print server 12, and plural or plural types of the two-way I/Fs 24 may be used. Further, connection by an arbitrary network protocol can be used for the network connection between the plural client terminals 14 and the print server 12.

The print server 12 can be structured by adding a PCI board having predetermined functions to a personal computer (PC), or the like. Further, the print server 12 has an input device such as a keyboard, a mouse, or the like, and a display device such as a CRT display, an LCD display, or the like. The print server 12 may have a WYSIWYG function that processes the image displayed on the display device and prints-out the displayed image.

A print controller 26, which controls the printer 18 together with the print server 12 itself, an image processing section 28, and an HDD 30, which stores various types of data, are provided at the print server 12. The image processing section 28 carries out RIP processing for generating raster data on the basis of job data such as image data or an image-drawing command or the like inputted as a print job from the client terminal 14.

At the print server 12, inputted print jobs are stored in a processing queue, the print jobs stored in the processing queue are read-out in order, and image processing (RIP processing) is carried out. The data, which has been subjected to image processing and is to be outputted to the printer 18 (the raster data), is stored in a printing queue and is outputted in order from this printing queue to the printer 18. The print server 12 is a general structure which stores and holds, in a holding queue, jobs for which printing processing has not been designated or jobs for which printing processing cannot be executed. Any of various types of conventionally-known structures can be used as the print server 12, and detailed description thereof will be omitted from the present embodiment.

On the other hand, the client terminal 14 has a DTP application (hereinafter called "application 32"). By using this application 32, the client terminal 14 can carry out image processings such as generation, manipulation, editing and the like of images and document text, so as to prepare an image-drawing command or image data for printing plate printing such as a page layout or the like (hereinafter called "image data").

A printer driver (driver software) 34 is provided at the client terminal 14. Via the printer driver 34, the client terminal 14 can transmit to the print server 12 a job (print job) including various types of processing instructions and image data such as a page layout or the like created by the application 32 or the like. At this time, settings of various types of printing functions can be carried out by the printer driver 34.

A printing function setting section 36 is provided at the print server 12. When a job such as a print job or the like is received, the printing function setting section 36 carries out setting of the respective types of printing functions which are instructed in the print job. Setting of conventionally-known printing functions can be carried out at the print server 12. The printing function setting section 36 determines the printing functions which are instructed in the print job, and carries out setting so that the respective printing functions are executed at the print controller 26 and the image processing section 28. Detailed description thereof is omitted from the present embodiment.

A color replacement processing section 38 is provided at the print server 12. When replacement of a designated color is set for an object of image-drawing, such as an image or characters or the like whose color is designated, the color replacement processing section 38 carries out color replacement on the basis of the setting.

The HDD 30 is provided at the print server 12. The HDD 30 is used as a storing section, and stores, separately from the process colors of cyan, magenta, yellow, and black and in the form of a table, CMYK values of each of spot colors which are set in advance.

When color replacement of any of the process colors by a spot color is designated, the color replacement processing section 38 refers, as a look-up table (LUT), to the CMYK values stored in the HDD 30, and updates the color information by setting it in CMYK values. Namely, the color replacement processing section 38 generates color information of new CMYK values by composing the CMYK values of the spot color stored in the HDD 30 with the CMYK values other than the color for which color replacement is designated.

In this way, when image data or document text data for two-color printing is prepared by using, for example, any two colors among the process colors, one color or the two colors thereof can be printed-out by using a spot color (or spot colors) which is (are) different than the process color(s).

Namely, when printing-out by using a printing plate, it is possible to carry out a simulation at the time of carrying out printing processing using an ink which is different than the process colors.

A region 40A for CMYK output and a region 40B for CMYK color correction are provided in a predetermined memory 40 in the image processing section 28. When image processing of an image (an image object) in a print job is carried out, the image processing section 28 stores the CMYK values of the spot color in the region 40A for CMYK output. Further, the CMYK values of the process color used in that image object are stored in the region 40B for CMYK color correction. Color correction is carried out on the CMYK values stored in the region 40B for CMYK color correction. Thereafter, by composing the corrected CMYK values with the CMYK values stored in the region 40A for CMYK output, new color information for that object of image-drawing is generated and outputted.

In this way, in the image processing section 28, even at the time of carrying out an N-color printing simulation by using a spot color, color correction of the CMYK values which are not subjected to color replacement is possible.

At the printer driver 34 provided at the client terminal 14, it is possible to set an N-color printing simulation which is provided as a function of the print server 12.

On the other hand, a spot color plate extracting section 42 is provided at the print server 12. The spot color plate extracting section 42 extracts an image object which is included in a print job and for which is designated image-drawing in a spot color different than the process colors of C, M, Y, K.

Namely, the application 32 provided at the client terminal 14 usually forms an image object by color plates of the process colors of C, M, Y, K, but there are cases in which an image object designating a color other than the process colors is added.

The spot color plate extracting section 42 extracts the image object designated at a color plate (hereinafter, "spot color plate") which is different than the C plate, the M plate, the Y plate, and the K plate.

At the printer driver 34 provided at the client terminal 14, in addition to N-color printing simulation using one or more of the color plates among the C plate, the M plate, the Y plate and the K plate, when there is a spot color plate, it is possible to designate whether or not that spot color plate is to be image-drawn, and when the spot color plate is to be image-drawn, designation of the color thereof is possible. Namely, setting of color replacement for the spot color plate is possible.

FIG. 2 shows a setting dialog 44 displayed as an example of a user interface on an unillustrated monitor of the client terminal 14 by the printer driver 34. In this setting dialog 44, it is possible to carry out the settings of an N-color printing simulation using color plates of the process colors of C, M, Y, K.

Namely, by using the color plates of the process colors, settings of from one-color printing simulation (N=1) to four-color printing simulation (N=4) are possible.

When N-color printing simulation using color plates of the process colors is to be carried out, it is possible to set, for each of the process colors of cyan (C), magenta (M), yellow (Y) and black (B), whether or not printing-out is to be carried out. At this time, by marking or not marking check boxes 46C, 46M, 46Y, 46K which are provided for the respective process colors, it is possible to set whether or not color plates of the respective process colors are to be outputted.

Further, combo boxes 48C, 48M, 48Y, 48K (hereinafter called "combo boxes 48" when referred to collectively) are provided for the respective process colors in the setting dialog 44. By selecting any of colors which are displayed in a pull-down menu for example, it is possible to set image-drawing in that color.

At this time, the spot colors which can be used at the print server 12 are displayed together with the process colors in the combo boxes 48. Namely, the spot colors, whose LUTs are stored in the HDD 30 of the print server 12, are displayed in pull-down menus.

In this way, the setting of color replacement for a color plate, and the setting of the replacement color, are carried out by selecting a spot color.

Here, by, for example, marking the check boxes 46C, 46M and inputting spot color 1 in the combo box 48C, it is possible to set a two-color printing simulation which replaces the C plate by spot color 1 and prints the M plate as is in magenta.

Usual printing processing can be carried out by marking the check boxes 46C, 46M, 46Y, 46K, and setting cyan in the combo box 48C, and inputting magenta, yellow and black in the combo boxes 48M, 48Y, 48K, respectively.

As the colors (the replacement colors, the conversion colors) designated in the combo boxes 48, it is possible to input a character string expressing the CMYK values, rather than the name of the spot color. For example, a form such as "=C10M20Y30K40" or the like can be accepted, and in this case, replacement is carried out by a color which is 10% cyan, 20% magenta, 30% yellow, and 40% black.

Setting for spot color plates which are different than the respective color plates of C, M, Y, K can be carried out in the setting dialog 44. Note that, in the setting dialog 44 shown in FIG. 2, an example in which the two colors of spot color A and spot color B are used for the spot color plates is shown, but one color or three or more colors may be used.

Here, when a spot color plate is to be image-drawn, check box 50A or check box 50B is marked. At this time, the color plate name is inputted in combo box 52. Note that the color plate name may be inputted automatically.

Namely, when there is, in a print job, the setting of a color plate name(s) of a spot color plate(s), the following is preferable: the color plate name(s) is(are) extracted, and if there is one color, it is displayed in the combo box 52 for the spot color A, and if there are two colors, they are displayed separately in the combo boxes 52 for the spot colors A, B, respectively.

Combo boxes 54A, 54B are provided in the setting dialog 44 for the spot colors A, B, respectively. The printing colors (image-drawing colors) can be inputted therein by pull-down menus for example. Note that FIG. 2 shows an example in which one color which is "spot color A" is inputted for the color plate name, and "spot color α" is inputted as the printing color (image-drawing color).

In this way, the settings of N-color printing simulations, which include spot color plates in the color plates of the process colors, are possible. At this time, if the spot color plate is one color (or if there is one spot color plate), N is from 1 to 5.

Such a user interface may be displayed not only on the client terminal 14, but on an unillustrated monitor at the print server 12, and the designations can be carried out at the print server 12. In this case, it suffices to be able to select the print job which is transmitted from the client terminal 14, and to display the user interface, and to carry out settings on that user interface.

A summary of the processings at the time of carrying out an N-color printing simulation for a print job including a spot color plate, by the print server 12 and the client terminal 14 which are structured in this way, will be described next.

Composite output processing for outputting to the printer 18, and composing processing of plate-separated outputs for preparing a printing plate for printing, can be carried out at the print server 12. The composite output processing will be described first.

An image processing device such as the print server 12 or the like is usually structured so as to have a color management system (CMS) which converts the CMYK values of an object of image-drawing into new CMYK values. This CMS can be used when composite output processing is carried out. Here, as an example, explanation will be given of color replacement using the color management system provided at the print server 12.

In the network 10, image data or an image-drawing command, which has been subjected to processings such as creation, manipulation, editing and the like at the client terminal 14 by using the application 30, is outputted as a print job to the print server 12.

At this time, at the client terminal 14, an N-color printing simulation can be designated by the printer driver 34. When an N-color printing simulation is to be carried out, the setting of the replacement color can be carried out at the same time. When a spot color plate of a color different than the process colors is included, processing for that spot color plate can be carried out at the same time.

When the print server 12 receives a print job, reading-in and setting of the printing functions is carried out at the printing function setting section 36. At the image processing section 28, RIP processing, which generates raster data from the image data or the image-drawing command of the print job, is carried out.

The raster data generated at the image processing section 28 is outputted to the printer 18 at a predetermined timing, and printing-out based on the print job is carried out at the printer 18.

Due to N-color printing simulation being designated, at the print server 12, color replacement of the respective process colors of C, M, Y, K to the designated colors is carried out, and when there is a setting (designation) of processing for a spot color plate, processing for that spot color plate is carried out at the same time.

Figure 3:
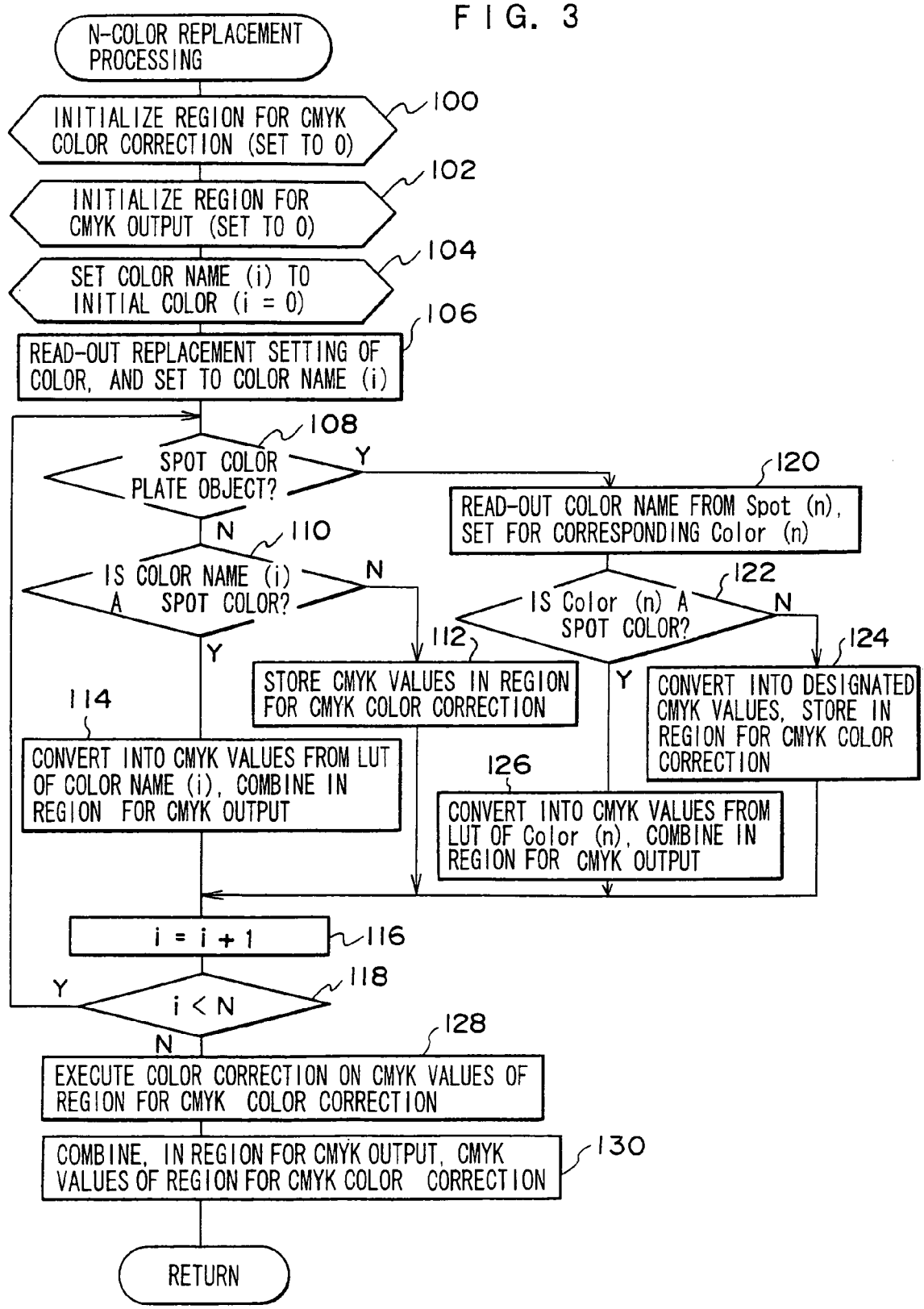
FIG. 3 is a flowchart showing a summary of color replacement for composite output.

FIG. 3 shows an example of procedures of the color replacement at this time. Here, in order to simplify explanation, color replacement in units of pixels of the object of image-drawing is carried out, and the CMYK values are stored in units of pixels in the region 40A for CMYK output and the region 40B for CMYK color correction.

This flowchart is executed when N-color printing is designated. Note that N is the sum of adding the number of the spot color plates to the number of the C, M, Y, K color plates. When there are two of the C, M, Y, K plates and one spot color plate, N=3.

In initial step 100 of this flowchart, the region 40B for CMYK color correction is initialized. In step 102, the region 40A for CMYK output is initialized. In step 104, a color variable i is set to an initial color (i=0).

Note that i is a variable from 0 to N. Input (i) is the input CMYK values. Color name (i) is the name of the replacement color of the C, M, Y, K (process color) plate. Region (i) for CMYK color correction is the region 40B for CMYK color correction which is set for each of the colors of C, M, Y, K. Spot (n) is the color plate name of the spot color plate, and Color (n) is the name of the replacement color. Further, n represents the number of spot color plates, and in the following description, explanation will be given of a case in which there is one spot color plate.

When the initial settings are completed in this way, in step 106, the color replacement settings are read-in, and the color name (i) to be processed first is set.

Thereafter, in step 108, first, it is confirmed whether an object of the color name (i) is an object of a spot color plate. Here, if it is an object of a process color plate and not a spot color plate, the determination in step 108 is negative. The routine moves on to step 110 where it is confirmed whether or not the color name (i) is a spot color.

At this time, if the replacement color is a process color (one of CMYK) and not a spot color, the determination in step 110 is negative. The routine moves on to step 112 where input (i) (CMYK values) is stored in the region (i) for CMYK color correction of the region 40B for CMYK color correction.

If the color name (i) is a spot color, the determination in step 110 is affirmative. The routine moves on to step 114 where, on the basis of the color name (i), the CMYK values of the designated spot color are read-out from the LUT stored in the HDD 30, and the input (i) is converted into CMYK values, and these CMYK values are composed in the region 40A for CMYK output.

Thereafter, in step 116, i is incremented (i=i+1). In next step 118, it is confirmed whether or not conversion of the replacement colors for all of the colors has been completed, i.e., it is confirmed whether the color variable i is less than or equal to N.

Here, if i<N, the determination in step 118 is affirmative. The routine returns to step 108, and color replacement for the next color is started.

On the other hand, when the object of the color name (i) is an object of a spot color plate, the determination in step 108 is affirmative, and the routine moves on to step 120. Namely, if the color name (i) is Spot (n), the routine proceeds to step 120, where the setting of the color for Spot (n) (i.e., the replacement color) is read-out, and that color is set for Color (n).

Thereafter, in step 122, it is confirmed whether or not the Color (n) is a spot color. If the Color (n) is not a spot color and is one of the process colors, the determination in step 122 is negative, and the routine proceeds to step 124.

In step 124, the input (i) is converted into CMYK values based on the color designation, and these CMYK values are stored in the region 40B for CMYK color correction of the corresponding color.

On the other hand, if the Color (n) is a spot color, the determination is in step 122 is affirmative, and the routine moves on to step 126.

In step 126, the input (i) is converted into CMYK values on the basis of the LUT of the corresponding spot color, and these CMYK values are substituted in for the CMYK values of the region 40A for CMYK output.

In this way, when the conversion to the replacement color has been completed for all of the N colors and the determination in step 118 is negative, the routine proceeds to step 128 where, first, predetermined color correction is carried out on the CMYK values stored in the region 40B for CMYK color correction. A conventionally-known method can be used for this color correction, and detailed description thereof will be omitted.

Next, the routine moves on to step 130 where the CMYK values subjected to the color correction are composed with the CMYK values stored in the region 40A for CMYK output.

Here, to describe a concrete example, in a document using cyan (a C plate) and magenta (an M plate) and one spot color plate which is spot color A, when replacing the spot color plate (spot color A) with "spot color α", the cyan plate (C) with "spot color 1", and the magenta plate (M) with "spot color 2" (see FIG. 2), "spot color A" is set for Spot (n), and "spot color α" is set for Color (n). Further, "spot color 1" and "spot color 2" are set for the color names (i). For example, the spot color 1 for the cyan plate is color name (0), and the spot color 2 for the magenta plate is color name (1).

In this way, color replacement to "spot color α", "spot color 1", and "spot color 2" is carried out on the spot color plate of spot color A, the C plate, and the M plate.

For spot color 1, CMYK values are computed from the LUT of spot color 1 and the input densities of the cyan plate, and are stored as CMYK values stored in the region 40A for CMYK output. For spot color 2, CMYK values are computed from the LUT of spot color 2 and the input densities of the magenta plate, and are composed with (added to) the CMYK values stored in the region 40A for CMYK output.

For spot color α, CMYK values are computed from the LUT of spot color α and the input densities of the spot color A plate, and are composed with the CMYK values stored in the region 40A for CMYK output.

At this time, for yellow (the Y plate) and black (the K plate), because output settings are not carried out, no substantial processing is carried out. Further, because they are not changed in the region 40B for CMYK color correction, they are "0". However, because there are cases such as when the background color is not white, color correction is carried out on the CMYK values stored in the region 40B for CMYK color correction, and the corrected values are composed with the CMYK values stored in the region 40A for CMYK output.

By carrying out replacement processing in this way, appropriate color replacement can be carried out for the color plates of the process colors. Moreover, even for print jobs such as documents or the like in which a color plate different than the process colors (i.e., a spot color plate) is included among the color plates of the process colors, the object corresponding to the spot color plate can be image-drawn appropriately.

When setting is carried out to stop image-drawing of a spot color plate, processing is not carried out for the spot color plate. Therefore, the object of the spot color plate does not appear in the results of image processing.

In this way, when preparing a question sheet of an exam for example, the text such as the questions or the like is prepared by using process colors, and the text giving the answers is prepared such that a color plate different than a process color (i.e., a spot color) is used for the answer spaces.

Thereafter, by printing-out a document such that the spot color plate is not outputted, an exam question sheet for students, which is printed in a single color, or two colors, or full color, is obtained. By designating printing-out of the spot color plate, the answer sheet for the teacher, in which the answers are included in the question sheet, is obtained.

Conventionally-known color correction can be carried out on CMYK values based on the respective plates of CMYK which are not designated to a spot color, and on CMYK values at the time of outputting a color plate which is different than CMYK. Therefore, appropriate color correction can be carried out without affecting the spot colors.

Because color replacement is not carried out at the client terminal 14, data management at the client terminal 14 is extremely easy.

By ensuring plural pixels' worth of the region 40A for CMYK output and the region 40B for CMYK color correction, it is possible to carry out batch color replacement processing within a collective region of the object of image-drawing, and not processing on a pixel-by-pixel basis.

On the other hand, when the CMYK values are determined from the spot color name such as spot color 1, spot color 2, spot color α, or the like, as shown in Table 1 for example, the L*a*b* values of 100% density of each spot color may be stored in the HDD 30, and CMYK value conversion may be carried out by using these L*a*b* values.

TABLE 1

|  | L* value | a* value | b* value |
|---|---|---|---|
| spot color 1 | 42.89 | 74.25 | −25.19 |
| spot color 2 | 44.30 | 46.38 | −6.17 |
| ... | ... | ... | ... |
| spot color a | 59.75 | −15.09 | 0.95 |

Figure 4:
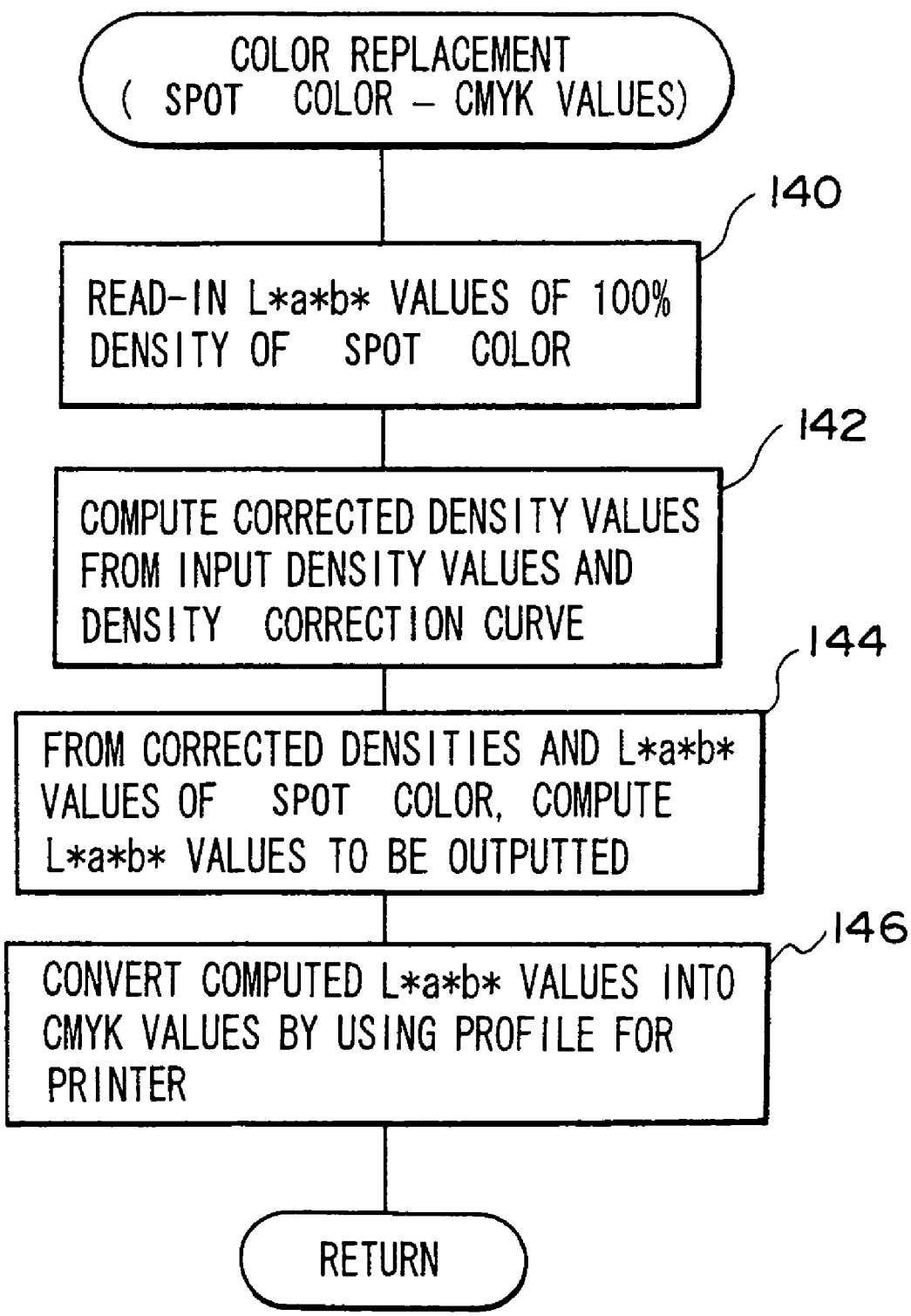
FIG. 4 is a flowchart showing a summary of CMYK value conversion.

FIG. 4 shows a summary at the time of carrying out, by using the LUTs shown in Table 1 for example, the CMYK value conversion executed in step 114 and step 126 of the flowchart in FIG. 3.

In the flowchart of FIG. 4, in initial step 140, the L*a*b* values of 100% density of the spot color designated by spot color 1, spot color 2, spot color α or the like, are read-in from the LUTs stored in the HDD 30. In subsequent step 142, the corrected densities are computed from the density values of the corresponding pixel and a density correction curve.

Thereafter, in step 144, the L*a*b* values to be outputted are computed from the corrected density values and the L*a*b* values of the spot color. In step 146, by using a profile for the output printer (e.g., for the printer 18), the L*a*b* values to be outputted are converted into CMYK values, and these CMYK values are stored or composed in the region 40A for CMYK output.

In the conversion of the CMYK values of the spot color (spot color 1, spot color 2, spot color α or the like), when computing the CMYK values for each density level from 0 to 255 for each spot color, the CMYK values may be read-out from the HDD 30 together with the densities of the corresponding pixel, as shown in Table 2.

TABLE 2

| cyan | magenta | yellow | black |
|---|---|---|---|
| 0 | 0 | 0 | 0 | 0 |
| 1 | 0 | 1 | 1 | 0 |
| ... | ... | ... | ... | ... |
| 255 | 122 | 255 | 100 | 100 |

In this way, when composite output is carried out, replacement of the CMYK values (color replacement) can be executed for each object of image-drawing, by executing CMS during rasterizing. Further, in the case of composite output, color replacement may be carried out by executing CMS on the rasterized raster data.

Next, plate-separated output will be described. When carrying out plate-separated output, output is carried out by separating the image data or image-drawing command into a cyan plate, a magenta plate, a yellow plate, a black plate, a spot color A plate, and the like. Therefore, CMS cannot be executed during rasterizing. Thus, CMS is executed on raster data which has been generated by rasterizing.

When plate-separated output is carried out, the order of outputting the color plates differs in accordance with the application. Therefore, the color name is determined from, for example, PostScript description.

For example, as shown in FIG. 5, in PostScript description, there is, in the comment column, a description expressing the color of the plate being processed, such as "% % PlateColor:Cyan" or "% % PlateColor:Spot colorA" or the like. By extracting this description, determination of the color plate which is currently undergoing processing can be carried out.

The user may carry out settings at the client terminal 14 or the like such that, when plate-separated output is carried out, for example, the first page is replaced with spot color 1, the second page is replaced with spot color 2, and the third page is replaced with spot color α.

On the other hand, in a method using raster data, color conversion processing is carried out after the conversion from the image-drawing command to raster data. Namely, carrying out processing for each raster data is the carrying out of processing for each color plate.

Figure 6:
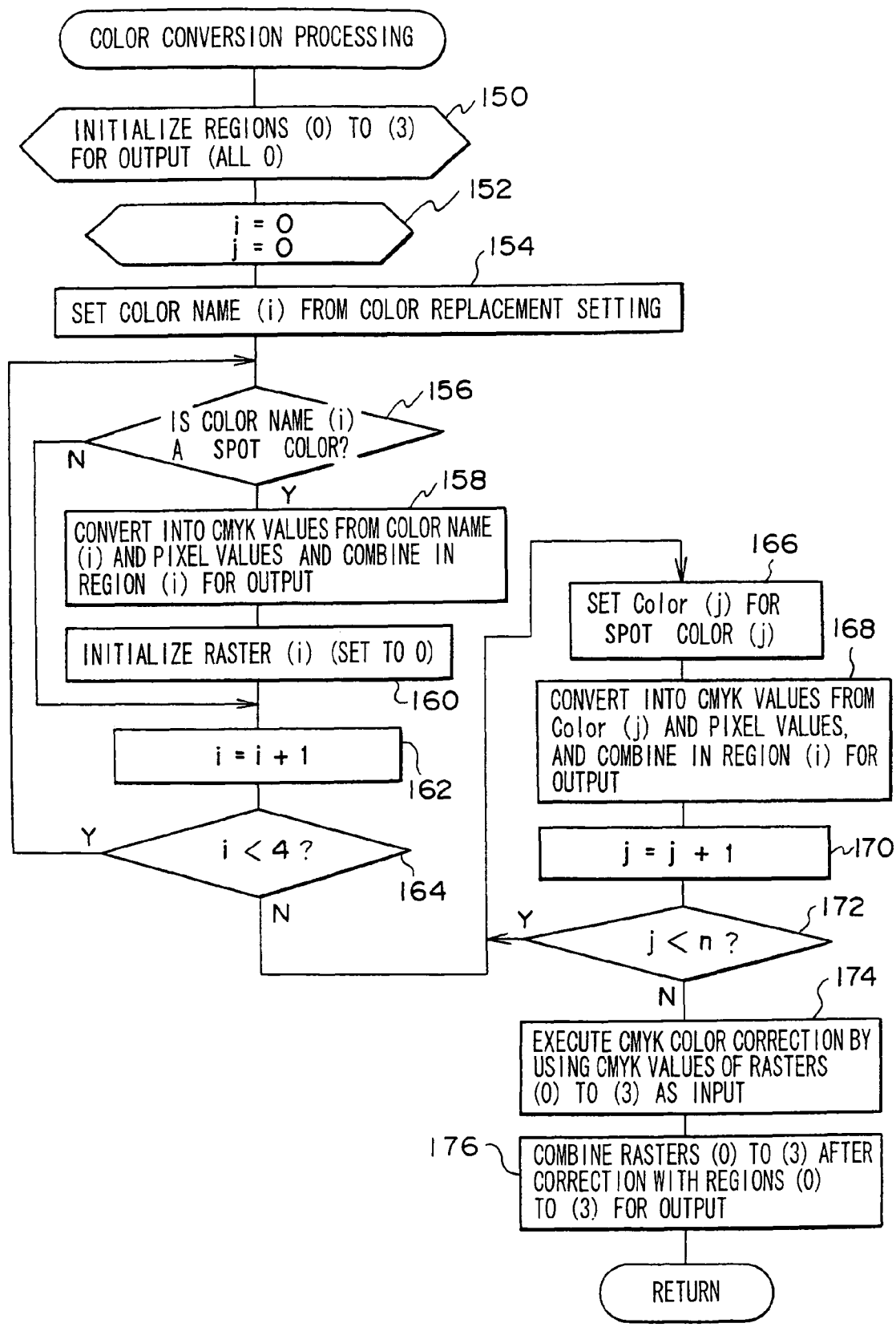
FIG. 6 is a flowchart showing a summary of color replacement for plate-separated output.

FIG. 6 shows a summary of the processings of color conversion (color replacement) using raster data, i.e., a summary of the processings at the time when the plate-separated outputs, which have been subjected to color replacement, are composed. Because color replacement is carried out on the plate-separated outputs by using raster data, the following discussion is applicable also to times when composite output processing is carried out.

In the explanation using FIG. 6, raster (i) (where i=0 to 3) is the address to the CMYK raster. Color name (i) is the conversion color (replacement color) of each color plate of CMYK. Region (i) for CMYK output is the address storing the CMYK raster for output. Further, the number of spot color plates is N, spot color plate (j) is the color name, and the conversion color (replacement color) is Color (j).

This flowchart is executed when rasterizing ends. In initial step 150, the region 40A for CMYK output is initialized. In step 152, i and j which are variables are initialized (i=0, j=0).

Thereafter, in step 154, the color name (i) to be processed is set by referring to the replacement settings. At the time of plate-separated output, because the region 40B for CMYK color correction is not used, this region can be allocated to the region 40A for CMYK output.

When the initial settings are completed in this way, in step 156, it is confirmed whether or not the color name (i) is a spot color. If it is a spot color, the determination in step 156 is affirmative, and the routine moves on to step 158. The CMYK values of the designated spot color are read-out from the LUT stored in the HDD 30, conversion of the CMYK values from the pixel values of the raster (i) is carried out, and the converted CMYK values are stored (composed) in region (i) for CMYK output. Namely, the CMYK values of the designated spot color are converted in accordance with the densities or the like of the corresponding pixels.

Thereafter, in step 160, the raster (i) which has been subjected to color conversion is initialized. In step 162, i is incremented (i=i+1). In step 164, from the value of i, it is confirmed whether or not processing is completed for the color plates of all four process colors. If processing is not completed (i<4), the determination in step 164 is affirmative. The routine moves on to step 156 where processing with respect to the next color (color plate) is carried out.

For color plates for which output has not been designated, or for color plates for which conversion to a spot color has not been designated, the determination in step 156 is negative, and the routine moves on to step 162.

In this way, when processing of the raster data of the color plates of the process colors is completed, the determination in step 164 is negative, and due to the routine moving on to step 166, processing for the spot color plate is carried out.

In the processing of the raster data of the spot color plate, first, in step 166, the Color (j) set for the spot color plate (j) is read-out, conversion from the color name of Color (j) to CMYK values is carried out, and the converted CMYK values are composed in regions (0) to (3) for CMYK output which are set for C, M, Y, K, respectively (step 168).

Thereafter, in step 170, j is incremented (j=j+1), and, from the value thereof, it is confirmed whether or not processing for all of the spot color plates is completed. Note that, when output of a spot color plate is not designated, the processings of steps 166 through 170 are omitted. Further, the processing of the spot color plates ends due to j becoming equal to n and the determination and step 172 being negative.

In this way, when processing of the raster data of the spot color plates and the color plates of the process colors is completed, the routine proceeds to step 174. In step 174, color correction is carried out on the CMYK values of rasters (0) through (3). Namely, color correction is carried out on the process colors remaining in the rasters (0) through (3).

Thereafter, in step 176, the rasters (0) through (3) are composed with the regions (0) through (3) for CMYK output, and the raster data of the respective colors of C, M, Y, K are generated.

Namely, when plate-separated output is carried out, at the print server 12, the image data or the image-drawing command is rasterized at the image processing section 28, and raster data of the respective colors (the process colors) of C (cyan), M (magenta), Y (yellow), and K (black) are obtained. At this time, when there is a color plate which is different than the process colors, the raster data of that color plate is obtained.

When color conversion (color replacement) is carried out, the raster data of that color plate is converted into CMYK values of the conversion color such as a spot color or the like, the converted raster data is composed, and raster data of each color for the plate-separated output is formed in the region for output.

Figure 7:
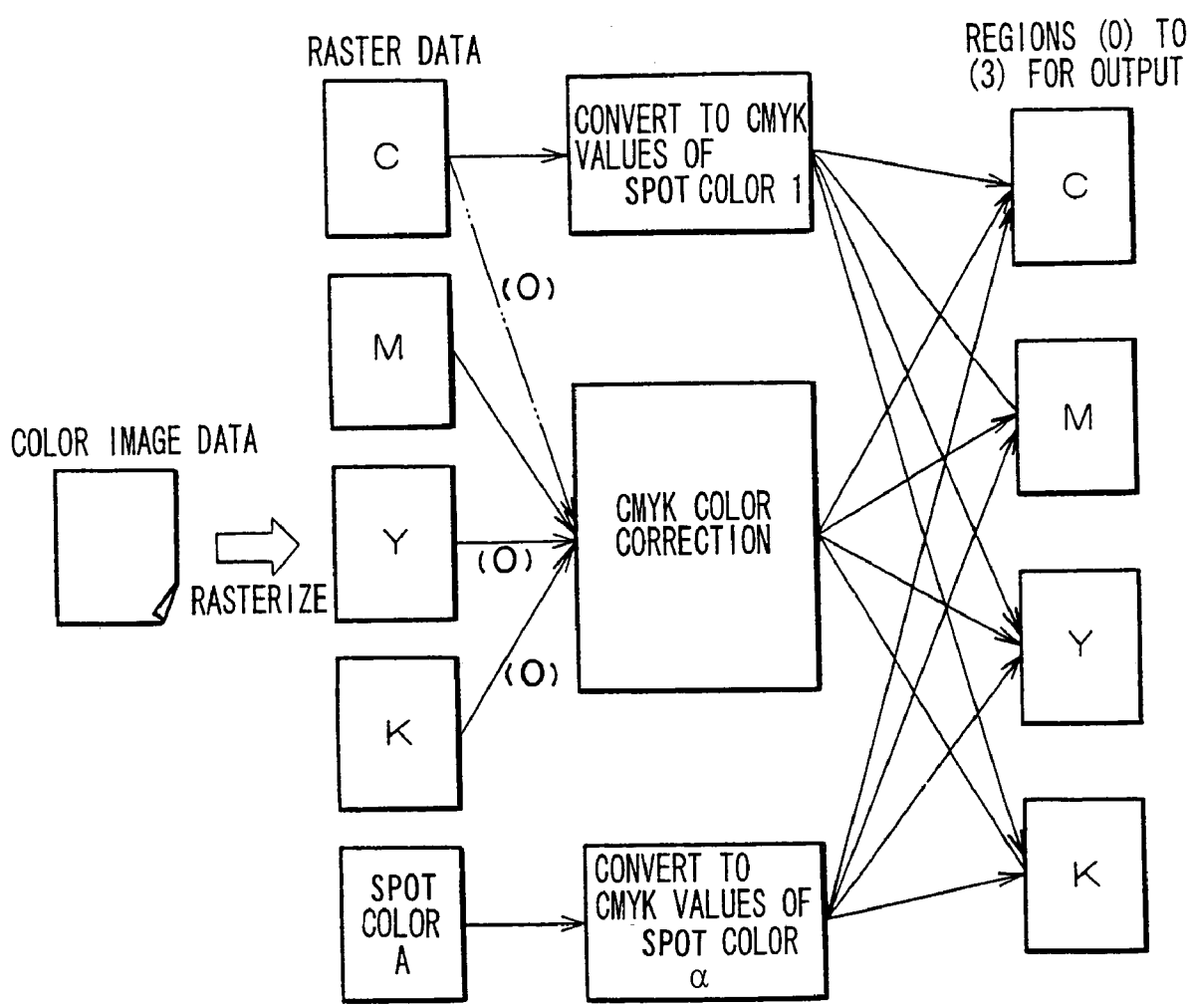
FIG. 7 is a schematic diagram showing the flow of plate-separated output processing.

For example, as shown in FIG. 7, by rasterizing color image data, a C plate, an M plate, a Y plate, and a K plate are generated. When, in the color image data, there is a color plate (spot color A) which is different than the process colors, the raster data of the color plate of spot color A is generated.

Here, when settings are carried out such that output of the C plate, the M plate and the spot color A plate is designated, and the C plate is replaced by spot color 1, and the M plate remains as is, and the spot color A plate is replaced by spot color α, the C plate is converted into CMYK values in accordance with spot color 1, and the CMYK values are stored in regions for output of the respective colors of C, M, Y, K.

Usually, color correction is carried out on the respective colors of C, M, Y, K. However, at this time, the data of the C plate, the Y plate and the K plate are respectively made to be "0", and CMYK color correction is carried out, and the CMYK values after correction are composed in the output regions of the respective colors.

The raster data of the spot color A plate is converted into CMYK values on the basis of spot color α which is the conversion color, and the CMYK values are composed in the regions for output.

By generating raster data of the respective colors of C, M, Y, K in this way, conventionally-known color correction can be carried out on the process colors for which color conversion to a spot color is not set. Therefore, appropriate color correction is possible without affecting the spot colors.

Further, even when there is, in the color image data, a color plate which is different than the process colors, the appropriate raster data based on the setting for that color plate can be generated easily.

Note that the above-described embodiment is not intended to limit the structure of the present invention. For example, in the present embodiment, description is given of a case in which an N-color printing simulation which includes a color plate different than the process colors is carried out in units of jobs. However, when there is image data or an image-drawing command for plural pages, color separation may be carried out in units of the pages.

In the present embodiment, description is given of processing of image data or an image-drawing command which is inputted to the print server 12 as a print job from the client terminal 14. However, the present invention is not limited to the same. The generation of data for an N-color printing simulation or data for N-color printing, which includes an object or the like formed by a color plate different than the process colors, can be carried out at the print server 12, an intermediate server, or the like.

Although the present embodiment describes a case in which the present invention is applied to the print server 12 of the network 10, the present invention is not limited to the same, and can be applied to an image processing device of an arbitrary structure which is connected to a network.

As described above, in accordance with the present invention, when a color plate which is different than process colors is included in addition to color plates of the process colors, appropriate processing can be carried out on the color plate which is different than the process color, without adversely affecting the color information of the respective color plates of the process colors.

In this way, there is the excellent effect that an appropriate printing simulation can be carried out even when there is a color plate which is different than the process colors.

In the present invention, multi-color printing simulation such as two-color printing simulation, three-color printing simulation or the like using color plates of process colors and color plates which are different than the process colors, can be carried out appropriately.

What is claimed is:

1. An image processing device comprising:
a print job receiving unit that receives an image data sent from an image processing terminal and a print job which is a drawing command;
a spot color replacement designating unit that receives a designation to replace a spot color, which is designated before receiving the print job, in the print job received by the print job receiving unit with a spot color which is different than the designated spot color, or that receives a designation to replace the spot color, which is designated before receiving the print job, in the print job received by the print job receiving unit with a process color which is different than the designated spot color;
an extracting unit that extracts color information of the spot color, which is designated before receiving the print job, in the print job received by the print job receiving unit;
a color replacing unit; wherein
when the spot color replacement designating unit receives a designation to replace with a spot color which is different than the designated spot color, replaces the color information of the spot color which is extracted by the extracting unit with the color information of the spot color designated by the spot color replacement designating unit and further replaces the color information of the replaced spot color with a CMYK value corresponding to the replaced spot color, and
when the spot color replacement designating unit receives a designation to replace with a process color which is different than the designated spot color, replaces the color information of the spot color which is extracted by the extracting unit with the color information of the process color designated by the spot color replacement designating unit;
a color correcting unit carrying out color correction on a CMYK value of a replaced process color but not carrying out color correction on a CMYK value of a replaced spot color.

2. The image processing device of claim 1, further comprising a raster data generating unit that generates raster data on the basis of the print job received by the print job receiving unit, wherein
when the color replacement designating unit receives a designation to replace with a spot color which is different than the designated spot color, the color replacing unit replaces the color information of the spot color which is extracted by the extracting unit with the color information of the spot color designated by the spot color replacement designating unit in units of pixels of the generated raster data, and replaces the color information of the replaced spot color with a CMYK value corresponding to the replaced spot color, and when the color replacement designating unit receives a designation to replace with a process color which is different than the designated spot color, the color replacing unit replaces the color information of the spot color which is extracted by the extracting unit with the color information of the process color designated by the spot color replacement designating unit in units of pixels of the generated raster data, and replaces the color information of the replaced process color with a CMYK value corresponding to the replaced process color.

* * * * *